(12) United States Patent
Glückstad

(10) Patent No.: US 8,203,788 B2
(45) Date of Patent: Jun. 19, 2012

(54) ELECTROMAGNETIC BEAM CONVERTER

(75) Inventor: Jesper Glückstad, Frederiksberg (DK)

(73) Assignee: Danmarks Tekinske Universitet, Lyngby (DK)

(*) Notice: Subject to any disclaimer, the term of this patent is extended or adjusted under 35 U.S.C. 154(b) by 121 days.

(21) Appl. No.: 12/677,650

(22) PCT Filed: Sep. 17, 2008

(86) PCT No.: PCT/DK2008/000328
§ 371 (c)(1),
(2), (4) Date: Jun. 30, 2010

(87) PCT Pub. No.: WO2009/036761
PCT Pub. Date: Mar. 26, 2009

(65) Prior Publication Data
US 2010/0277785 A1    Nov. 4, 2010

Related U.S. Application Data

(60) Provisional application No. 60/972,852, filed on Sep. 17, 2007.

(30) Foreign Application Priority Data

Sep. 17, 2007   (DK) .................................. 2007 01334

(51) Int. Cl.
G02B 5/08   (2006.01)
G02F 1/01   (2006.01)

(52) U.S. Cl. ........................................ 359/559; 359/279

(58) Field of Classification Search ............... 250/201.9, 250/251; 324/76.36; 359/279, 559, 562
See application file for complete search history.

(56) References Cited

U.S. PATENT DOCUMENTS 8,125,713 B2 * 2/2012 Gluckstad .................... 359/559
2009/0310206 A1 * 12/2009 Gluckstad .................... 359/238

FOREIGN PATENT DOCUMENTS

| EP | 0840159 A2 | 5/1998 |
| WO | 9634207 | 10/1996 |
| WO | 02052332 A2 | 7/2002 |
| WO | 2004113993 A1 | 12/2004 |
| WO | 2005096115 A1 | 10/2005 |

OTHER PUBLICATIONS

Gluckstad J et al: "Optimal Phase Contrast in Common-Path Interferometry" Applied Optics Opt. Soc. America USA, vol. 40, No. 2, Feb. 1, 2000, pp. 268-282.
Mogensen P C et al: "Dynamic Array Generation and Pattern Formation for Optical Tweezers" Optics Communications, North-Holland Publishing Co., Amsterdam, NL, vol. 175, No. 1-3, Feb. 1, 2000, pp. 75-81.

* cited by examiner

Primary Examiner — David N Spector
(74) Attorney, Agent, or Firm — Volentine & Whitt, PLLC

(57) ABSTRACT

The present invention relates to an electromagnetic beam converter and a method for conversion of an input beam of electromagnetic radiation having a bell shaped intensity profile $a(x,y)$ into an output beam having a prescribed target intensity profile $I(x',y')$ based on a further development of the generalized phase contrast method.

12 Claims, 5 Drawing Sheets

8,203,788 B2

ELECTROMAGNETIC BEAM CONVERTER

CROSS REFERENCE TO RELATED APPLICATIONS

This application is the national phase under 35 U.S.C. 371 of PCT International Application No. PCT/DK2008/000328 which has an international filing date of Sep. 17, 2008, and also claims priority under 35 U.S.C. 119 to Danish application PA 2007 01334 filed on Sep. 17, 2007, and to U.S. Provisional application 60/972,852 filed on Sep. 17, 2007, which applications are hereby incorporated by reference in their entirety for all purposes as if fully set forth herein.

The present invention relates to an electromagnetic beam converter and a method for conversion of an input beam of electromagnetic radiation having a bell shaped intensity profile $a(x,y)$ into an output beam having a prescribed target intensity profile $I(x',y')$ based on further development of the generalized phase contrast method [13,14].

The demand from various laser applications for beams with uniform intensity on a specified transverse distribution keeps researchers actively looking for optimal ways to convert the bell-shaped profile emitted by most lasers into a uniform intensity profile [1,2]. One of the oldest tricks, where an expanded beam is truncated to minimize in-homogeneity, remains a popular choice for its simplicity, especially when energy throughput is not of prime concern. These applications can also benefit from inhomogeneous absorptive filters that attenuate the central parts of the beam more than the peripheral portions to get a homogenized beam, i.e. a beam with a uniform intensity profile [3,4].

Energy-efficient approaches reach a wider spectrum of laser applications. Toward this end, many employ geometric principles to design refractive or reflective systems that redirect portions of an incident Gaussian beam into homogenized distributions [5-11]. This energy rerouting scheme is implemented through lenses, mirrors, or even lenslet arrays that initially separate an incident Gaussian into discrete beams and then recombine them into homogeneous distributions [8]. Geometric solutions remap each portion of the incident beam to target locations on the output plane. In contrast, efficient conversion using diffraction-based techniques [9-12] modify the incident beam such that each portion contributes to all points of the homogenized beam in the output plane. The required diffractive element is commonly designed through time-consuming and iterative optimization procedures [10-12].

Refractive beam shaping solutions remap available energy with promise of lossless conversion over a wide range of wavelengths. However, fabrication of the required refractive elements can be problematic, especially when aimed at generating arbitrary intensity profiles that lack circular symmetry. Microlens arrays, which divide an incident beam into beamlets that are later recombined in beam integrators, may be easier to fabricate but the resulting beams can have very poor homogeneity, especially under coherent illumination. These integrators are likewise strongly limited in terms of re-configurability of the generated intensity patterns. Diffractive optical approaches offer capacity for producing a variety of beam shapes, with some compromise on phase homogeneity, and are rich in design algorithms that promise theoretical high conversion efficiencies. However, fabrication errors can degrade the efficiency and uniformity of the generated patterns. Since phase errors can easily give rise to a spurious zero-order beam, diffractive designs commonly avoid the optimal optical re-construction region: the optical axis (desired in terms of both optimizing efficiency and minimizing aberrations).

The Generalized Phase Contrast (GPC) method [13,14] which is a generalization of Zernike's Nobel awarded technique [15] achieves high efficiency using a very straightforward design of the needed optical element. The input simply requires an easy-to-fabricate phase mask that is patterned directly point-for-point after the desired intensity distribution. Thus, static applications of GPC-based beam-shaping are less susceptible to fabrication errors and can as well provide excellent output phase homogeneity unlike that of diffractive approaches. Compared to diffractive optical elements, the GPC phase mask generally contains fewer locations with phase jumps and, hence, suffers less from scattering losses. Additionally, the GPC intensity projections can be centred on the optical axis to minimize aberration effects. The GPC method has been successfully implemented for lossless pattern projection but always assuming uniform input illumination [16].

The simplicity of designing phase inputs in the GPC-based approach lends itself to dynamic pattern reconfiguration that is limited only by the frame-rate of the encoding device (e.g., this can reach up to kilohertz in ferroelectric liquid crystals). This high refresh rate is achieved without compromising issues associated with speckle, spurious higher orders and zero-order effects that are expected in computer generated phase holograms, especially when the number of iterations is compromised for faster computation. Coupled to microscope objectives, GPC-generated patterns have demonstrated capacity for fully dynamic and interactive optical micromanipulation [17-20]. The GPC method has also been exploited for phase-only optical encryption and decryption [21,22].

It is an object of the present invention to provide an electromagnetic beam converter and a method for conversion of an input beam of electromagnetic radiation having a bell shaped intensity profile $a(x,y)$ into an output beam having a prescribed target intensity profile $I(x',y')$, for example to be able to generate a beam of electromagnetic radiation with a uniform intensity profile across a cross-section of the beam and, optionally, with a beam circumference of an arbitrary prescribed shape. Such a method and system may be utilized in advanced optical micro- and nano-manipulation, such as by provision of a multiple-beam optical tweezer.

Throughout the present disclosure, a beam of electromagnetic radiation is also denoted an electromagnetic beam or an electromagnetic field or just a beam or a field.

According to a first aspect of the invention the above-mentioned and other objects are fulfilled by an electromagnetic beam converter for conversion of an input beam of electromagnetic radiation incident upon it and having a bell shaped intensity profile $a(x,y)$ into an output beam having a prescribed target intensity profile $I(x',y')$, the beam converter comprising a generalized phase contrast system with a phase modifying element positioned for illumination by the input beam with the bell-shaped intensity profile and for phase modulation of the input beam by phasor values $e^{i\phi(x,y)}$ thereby forming phase modulated radiation or field $a(x,y) e^{i\phi(x,y)}$, first Fourier or Fresnel optics positioned in the propagation path of the phase modulated field for Fourier or Fresnel transforming the phase modulated electromagnetic field $a(x,y) e^{i\phi(x,y)}$, a spatial filter for filtering the Fourier or Fresnel transformed electromagnetic radiation by in a region of spatial frequencies comprising DC in the Fourier or Fresnel plane phase shifting with a predetermined phase shift value θ the modulated electromagnetic radiation in relation to the remaining part of the electromagnetic radiation, and multiplying the amplitude of the modulated electromagnetic radiation with a constant B, and in a region of remaining spatial frequencies in the Fourier or Fresnel plane, multiplying the amplitude of the modulated electromagnetic radiation with a constant A, and second Fourier or Fresnel optics for forming an output electromagnetic field with the prescribed intensity profile I(x', y') by Fourier or Fresnel transforming the phase shifted Fourier or Fresnel transformed electromagnetic field.

According to a second aspect of the invention the above-mentioned and other objects are fulfilled by a method for conversion of an input electromagnetic beam having a bell shaped intensity profile a(x, y) into an output beam having a prescribed target intensity profile I(x',y') using a generalized phase contrast system.

Then method includes the steps of
illuminating a phase modifying element with the input beam of electromagnetic radiation a(x,y) having a bell-shaped intensity profile across the phase modifying element for phase modulation of the input electromagnetic radiation a(x, y) by phasor values $e^{i\phi(x,y)}$ thereby forming phase modulated field or radiation a(x,y) $e^{i\phi(x,y)}$, Fourier or Fresnel transforming the phase modulated electromagnetic radiation a(x,y) $e^{i\phi(x,y)}$, spatially filtering the Fourier or Fresnel transformed electromagnetic radiation by in a region of spatial frequencies comprising DC in the Fourier or Fresnel plane phase shifting with a predetermined phase shift value θ the modulated electromagnetic radiation in relation to the remaining part of the electromagnetic radiation, and multiplying the amplitude of the modulated electromagnetic radiation with a constant B, and in a region of remaining spatial frequencies in the Fourier or Fresnel plane, multiplying the amplitude of the modulated electromagnetic radiation with a constant A, and Fourier or Fresnel transforming the phase shifted Fourier or Fresnel transformed electromagnetic field.

In an embodiment of the present invention, the spatial phase filter substantially does not attenuate the electromagnetic fields incident upon it outside the phase shifting regions, i.e. A is equal to one or approximately equal to one.

In an embodiment of the present invention, the spatial phase filter substantially does not attenuate the electromagnetic fields incident upon it inside the phase shifting region, i.e. B is equal to one or approximately equal to one.

The input light beam may have a Gaussian intensity profile with a beam waist $w_0$, i.e. the amplitude a (x,y) of the input electromagnetic field is defined by $$a(x,y)=a(r)=\exp[-r^2/w_0^2]$$

r is the distance from the centre of the beam.

As will be shown in more detail later, the phase shift θ ranges from $0.55\pi < \theta < 0.95\pi$ and often from $0.7\pi$ to $0.95\pi$ for a number of beam intensity profiles and beam circumferences.

Although, the source of the input beam of electromagnetic radiation is termed "light source" throughout the present disclosure, the electromagnetic field or radiation may be of any frequency range of the electromagnetic spectrum, i.e. the gamma frequency range, the ultraviolet range, the visible range, the infrared range, the far infrared range, the X-ray range, the microwave range, the HF (high frequency) range, etc. The present invention is also applicable to particle radiation, such as electron radiation, neutron radiation, etc.

Preferably, the electromagnetic fields are monochromatic or quasi-monochromatic so that the energy of the electromagnetic fields is concentrated in a narrow frequency bandwidth. Since the phase contrast generated amplitude pattern is reconstructed by interference of two electromagnetic fields generated by different phase shifting of different parts of the incoming field, it is required that the frequency range of the emitted electromagnetic field is sufficiently narrow to ensure that the two electromagnetic fields are coherent so that their superposition generates the desired amplitude pattern. If the frequency range is too broad, the two fields will be incoherent and the phase information will be lost as superposition of non-coherent fields results in a summation of the intensities of the two fields. It is required that the difference between individual delays of electromagnetic fields to be superpositioned is less than the wavelength of the fields. This is a relaxed requirement that allows the electromagnetic fields to be relatively broad-banded. For example in the visible range, a Xe-lamp or a Hg-lamp can be used as a light source in a system according to the present invention with the advantage compared to a laser light source that speckle noise is reduced. The requirements of the spatial coherence of the electromagnetic fields depend upon the space bandwidth product of the corresponding system and how close the required system performance is to the theoretically obtainable performance of the system.

Preferably, the electromagnetic radiation is generated by a coherent source of electromagnetic radiation, such as a laser, a semi-conductor laser, a strained multi-quantum well laser, a vertical cavity surface emitting laser (VCSEL), a maser, a phase-locked laser diode array, a light emitting diode, a pulsed laser, such as a sub-picosecond laser, etc, or an array of such sources. However, as already mentioned, a high-pressure arc lamp, such as an Hg lamp, a Xe lamp, etc, may also be used and even an incandescent lamp may be used as a source of electromagnetic radiation.

Thus, the input electromagnetic field or radiation may constitute a beam of radiation with a substantially circular cross-section or with a substantially elliptical cross-section. For example, an edge emitting laser diode typically emits an elliptical light beam, and a VCSEL typically emits a circular light beam.

The phase modifying element changes the phase of an electromagnetic field incident upon it. Optionally, it may also change the amplitude of an electromagnetic field incident upon it. Each phase modifying element may transmit or reflect the incident electromagnetic field. Each phase modifying element may be divided into a number of resolution elements, each of which modulates the incident electromagnetic field by changing its phase by a specific predetermined value. The predetermined values are assigned to each resolution element in different ways depending upon the technology applied in the component. For example in spatial light modulators, each resolution element may be addressed either optically or electrically. The electrical addressing technique resembles the addressing technique of solid-state memories in that each resolution element can be addressed through electronic circuitry to receive a control signal corresponding to the phase change to be generated by the addressed resolution element. The optical addressing technique addresses each resolution element by pointing a light beam on it, the intensity of the light beam corresponding to the phase change to be generated by the resolution element illuminated by the light beam.

The phase modifying element may be realized utilizing a fixed phase mask, a liquid crystal device based on liquid crystal display technology, a MEMS (micro electro-mechanical system), a MOEMS (micro opto-electro-mechanical system), such as a dynamic mirror device, a digital micro-mirror array, a deformable mirror device, etc, a membrane spatial light modulator, smart pixel arrays, etc.

In an embodiment of the invention, the light source emitting the input beam of electromagnetic radiation is integrated with the phase modifying element.

Seiko-Epson produces a transmitting liquid crystal SLM (LC-SLM) having a high resolution matrix of transparent liquid crystal elements wherein the relative permittivity of each element can be electrically modulated in order to vary the refractive index and thereby the optical path length of the element.

Meadowlark produces a parallel-aligned liquid crystal (PAL-SLM) with a high fill factor, but this device has a very low resolution in that it contains only 137 phase-modulating elements.

Hamamatsu Photonics produces a dynamically controllable PAL-SLM with VGA or XGA resolution.

Texas Instruments produces a Digital Mirror Device (DMD) having an array of mirrors each of which can be tilted between two positions.

In a preferred embodiment, the spatial phase filter is a fixed phase mask, such as an optically flat glass plate coated with a dielectric layer in the region wherein the modulated electromagnetic field is phase shifted θ in relation to the remaining part of the electromagnetic field. However, the spatial phase modulators mentioned in the previous section may also be used for spatial phase filters. In addition, non-linear materials providing self-phase modulation, such as Kerr-type materials, can also be used for introducing the phase shift θ.

An imaging system maps the phase modulating resolution elements of the phase modifying element onto an image plane. This imaging system may comprise a 4f-lens configuration (two Fourier transforming lenses utilizing transmission of light or one Fourier transforming lens utilizing reflection of light) or a single imaging lens. However, any optical imaging system providing a filtering plane for the spatial phase filter may be applied in a phase contrast imaging system.

In the method and system according to the present invention, the output electromagnetic field o(x', y') is generated by superposition of electromagnetic fields in the image plane of the imaging system. The phase modifying element changes the phase values of an electromagnetic field incident upon it and the imaging system directs the electromagnetic field with changed phases reflected from or transmitted through the phase modifying element towards the spatial phase filter. The phase filter phase shifts a part of the electromagnetic field and the imaging system is adapted to superimpose in the image plane the phase shifted part of the electromagnetic field with the part of the electromagnetic field that is not phase shifted by the spatial phase filter.

According to a preferred embodiment of the invention, the phase modifying element is positioned at the front focal plane of a lens while the spatial phase filter is positioned in the back focal plane of the lens, whereby a first electromagnetic field at the phase modifying element is Fourier transformed by the lens into a second electromagnetic field at the phase filter. Thus, specific spatial frequencies of the first electromagnetic field will be transmitted through the spatial phase filter at specific positions of the phase filter. For example, the energy of the electromagnetic field at zero frequency (DC) is transmitted through the phase filter at the intersecting point of the Fourier plane and the optical axis of the lens also denoted the zero-order diffraction region.

The positioning and/or shape of the phase shifting region of the spatial filter may be matched to the geometry of the source. For example, the phase shifting region of the spatial is positioned at the zero-order diffraction region of the light source and the shape of the phase shifting region matches the shape of the zero-order diffraction region of the light source.

The capability of handling high energy levels of electromagnetic fields of the present invention may be utilized for provision of a 3D laser cutter comprising a system according to the present invention.

Further, the capability of handling high energy levels in combination with the capability of generating a desired beam intensity profile may be utilized for provision of an optical tweezer or an array of optical tweezers.

The above and other features and advantages of the present invention will become readily apparent to those skilled in the art by the following detailed description of exemplary embodiments thereof with reference to the attached drawings, in which.

The figures are schematic and simplified for clarity, and they merely show details which are essential to the understanding of the invention, while other details have been left out. Throughout, the same reference numerals are used for identical or corresponding parts.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the concept of the invention to those skilled in the art.

Figure 1:
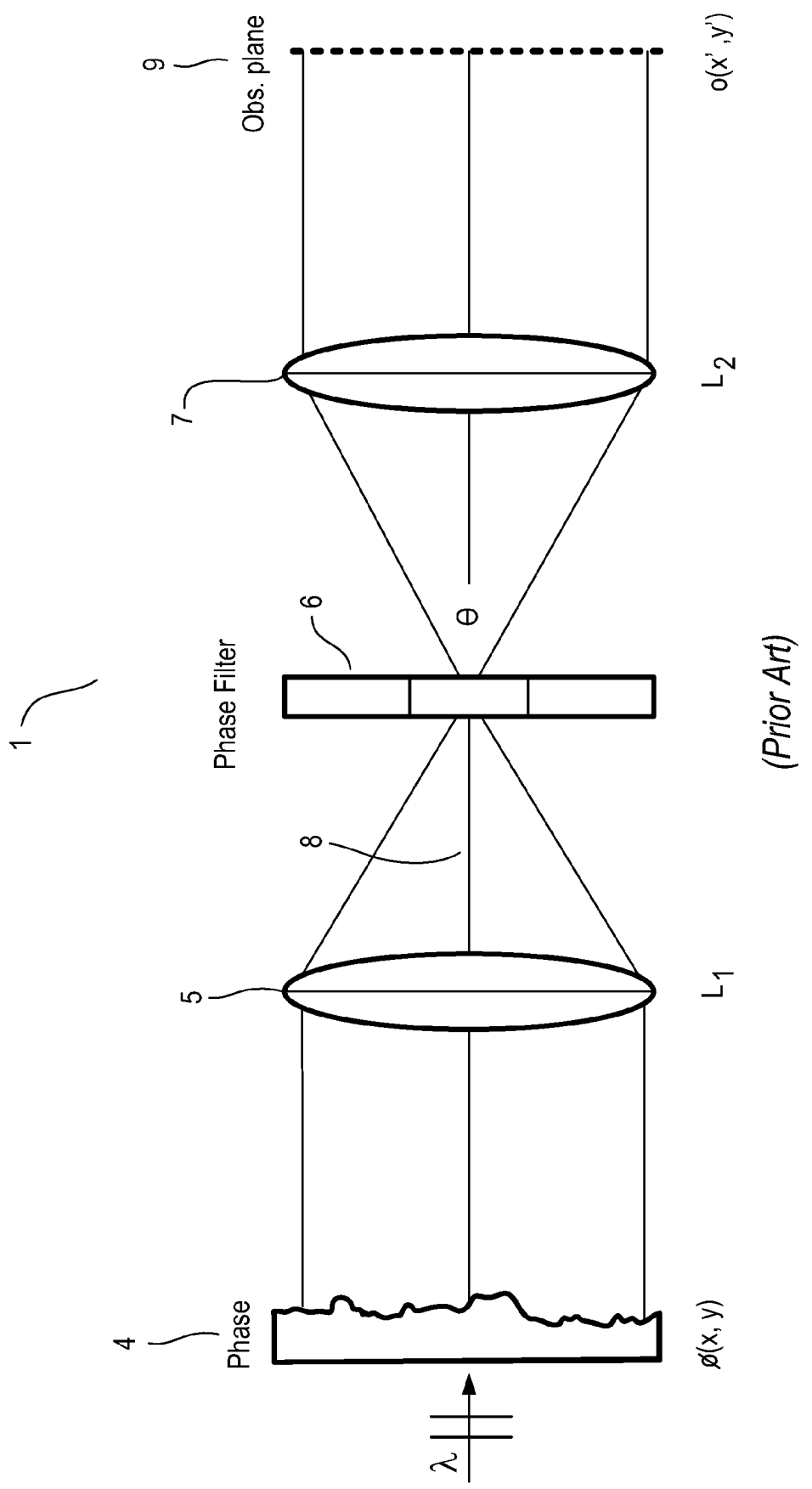
FIG. 1 illustrates schematically a known 4f phase contrast imaging system.

A commonly applied architecture that provides an efficient platform for spatial filtering is illustrated in FIG. 1 and is based on the so-called 4-f configuration. An output interferogram of an unknown phase object or phase disturbance is obtained by applying a truncated on-axis filtering operation in the spatial frequency domain between two Fourier transforming lenses (L1 and L2). The first lens performs a spatial Fourier transform so that directly propagated light is focused into the on-axis filtering region whereas spatially varying object information generates light scattered to locations outside this central region. A general Fourier filter is provided in which different phase shifts and amplitude damping factors are applied to the "focused" and "scattered" light. In FIG. 1, a circularly symmetric Fourier filter is shown with amplitude transmission factors A and 8 for "scattered" and "focused" light, respectively, and a relative phase shift θ. These filter parameters can be chosen to replicate any one of a large number of commonly used filter types (i.e. phase contrast, dark central ground, point diffraction and field-absorption filtering). By applying a given Fourier filter and a second Fourier lens, an interference pattern is obtained in the observation plane. The focused on-axis light acts as the synthetic reference wave (SRW) in the common path interferometer (CPI) system, this interferes with the scattered light to generate the output interference pattern. In the following section, the importance of the SRW is discussed it is shown show how it influences, among other things, the choice of the Fourier filter parameters.

Thus, FIG. 1 shows a known 4f CPI phase contrast imaging system 1. A laser (not shown) emits a light beam, which is expanded by a beam expander (not shown) into a plane light wave of uniform intensity and directs it towards a phase modifying element 4. The light beam is transmitted through the phase modifying element 4 and a Fourier transforming lens L1. The phase modifying element 4 is positioned in the front focal plane of the lens L1 and a spatial phase filter 6 is positioned in the back focal plane of the lens L1 that is also the front focal plane of a lens L2. The Fourier transforming lenses L1, L2 need not have identical focal lengths. Different focal lengths lead to a magnification ratio different from one. The spatial phase filter 6 phase shifts by θ and optionally attenuates (by a factor B), the zero order diffraction part 8 of the light phase modulated by the phase modifying element. Optionally, the remaining diffraction part of the light modulated by the phase modifying element may be attenuated by a factor A. The electromagnetic field o(x', y') is generated in the back focal plane 9 of the lens L2.

Figure 2:
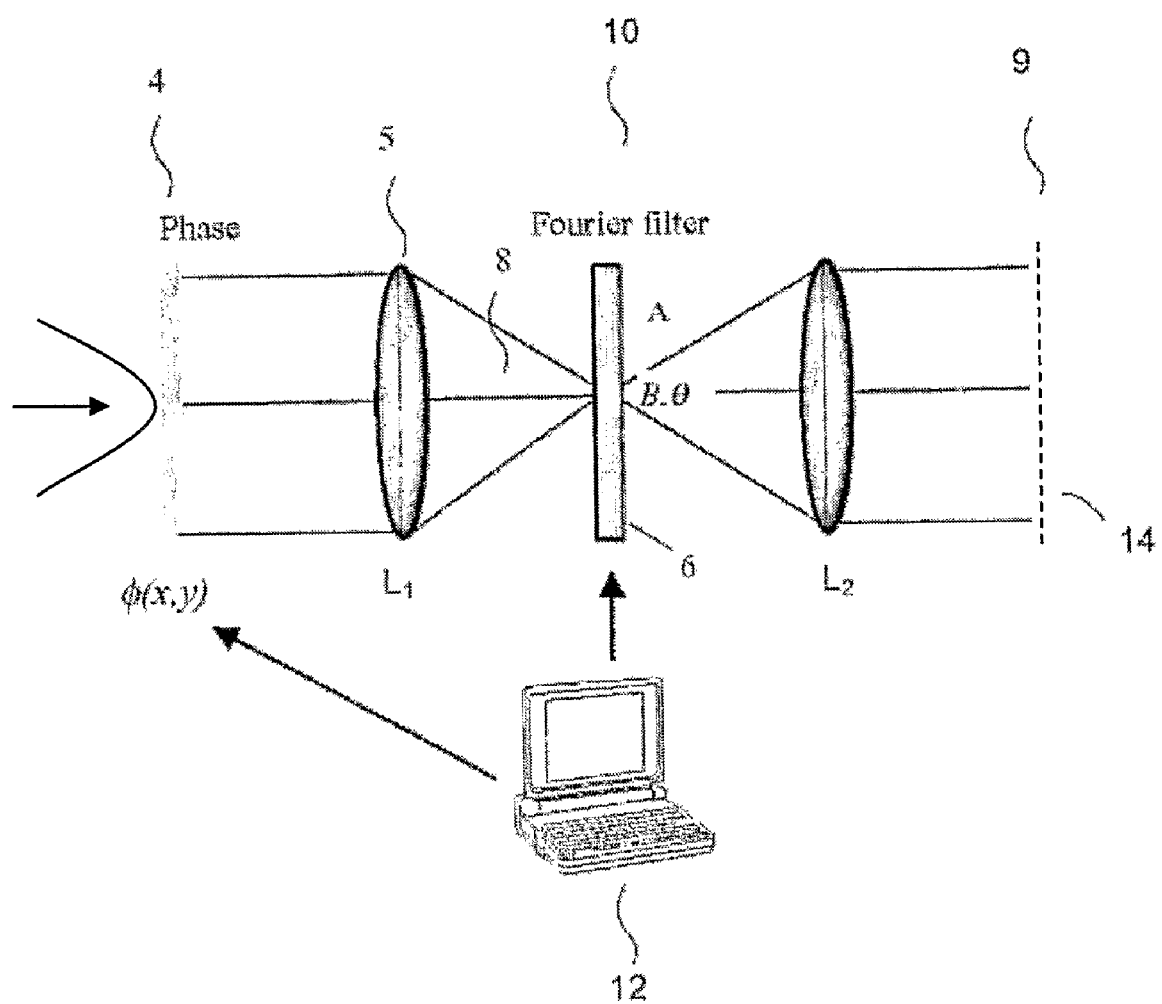
FIG. 2 illustrates schematically an embodiment of the present invention.

FIG. 2 illustrates schematically an embodiment 10 of the present invention, comprising a 4f CPI phase contrast imaging configuration as illustrated in FIG. 1. Corresponding parts in the figures are designated with identical reference numerals. It is obvious for the person skilled in the art that the 4f configuration may be substituted by the 2f or 1f configurations disclosed in WO 96/34207. The operation of the 4f CPI phase contrast imaging system is explained with reference to FIG. 1 and is not repeated.

It is an important difference between the embodiment illustrated in FIG. 2 and known GPC systems that the input electromagnetic field in the illustrated embodiment of FIG. 2 is non-uniform whereas the input electromagnetic field incident on the phase modifying element 4 in known GPC systems is a plane light wave of uniform intensity. The input field of the embodiment of FIG. 2 has a Gaussian intensity profile and the phase modifying element 4 is illuminated with a significant part of the Gaussian profile, i.e. the input field incident on the phase modifying element 4 is non-uniform.

In the illustrated embodiment, the phase modifying element 4 has a plurality of individual resolution elements (x, y), each resolution element (x, y) modulating the phase of electromagnetic radiation incident upon it with a predetermined phasor value $e^{i\phi(x,y)}$. For a Gaussian input field, the phasor values $e^{i\phi(x,y)}$ are calculated in accordance with equation (16) below.

In the illustrated embodiment, the computer 12 supplies the phasor values $e^{i\phi(x,y)}$ to the respective resolution elements (x, y) of the phase modifying element 4, and supplies the determined θ value to the spatial phase filter 6.

In principle, any desired amplitude of the output field o(x', y')$e^{i\Psi(x',y')}$ may be synthesized by the method and apparatus according to the present invention.

The output field o(x', y')$e^{i\Psi(x',y')}$ propagates and constitutes the desired output field, i.e. the light is re-distributed into an arbitrary beam of electromagnetic radiation.

Further, the computer 12 may comprise light control means for controlling the power of the light-emitting source generating the field incident on the phase modifying element 4. The computer may also comprise input means, such as a keyboard, a mouse, a 3D mouse, 3D virtual reality equipment, a diskette drive, a USB interface, an optical disc drive, a network interface, a modem, etc, for receiving parameters of an electromagnetic field to be synthesized by the system 10. From the received field parameters, the computer may be adapted to calculate phasor values $e^{i\phi(x,y)}$ to be transmitted to the respective resolution elements (x, y) of the phase modifying element 4 and calculate the phase shift θ of the spatial phase filter 6 for transmission to the spatial phase filter 6 in accordance with the above-mentioned equations.

Mathematical Analysis

The combination of GPC with bell-shaped illumination represents a novel undertaking in GPC theory development. All previous theoretical and experimental GPC studies used uniform input illumination to secure a phase-only input pattern for the GPC system. Experimentally, uniform illumination requires beam shaping optics to convert the Gaussian laser beam to an appropriate profile and finding efficient conversion techniques continues to attract research attention. Thus, the present invention provides a method and a system for utilization of GPC to efficiently generate optical beam patterns directly from an unshaped incident Gaussian beam. This contributes to the available techniques for reshaping Gaussian beams, considering the advantages of the GPC method over the other approaches. The GPC capacity for generating exotic shapes at rapid reconfiguration rates is particularly attractive, since the current literature is focused on static and simple patterns, owing to practical constraints in the other methods.

Let's consider the 4f optical processing setup in FIG. 1, which is the typical implementation of the generalized phase contrast method. The field at the input plane, p(x,y)=a(x,y) exp[iφ(x,y)], is generated when an incident beam illuminates a phase-only spatial light modulator (SLM). The phase contrast filter (PCF) at the common focus between the Fourier lenses, described mathematically by $$H(f_x,f_y)=1+[\exp(i\theta)-1]S(f_x,f_y), \quad (1)$$

shifts the phase of the diffraction-limited zero-order beam by θ within an aperture region defined by $S(f_x,f_y)$. This filter transmits the original field and synthesizes a phase-shifted reference wave. The intensity pattern at the output plane, $$I(x',y')\approx|a(x',y')\exp[i\phi(x',y')]+\bar{\alpha}[\exp(i\theta)-1]g(x',y')|^2, \quad (2)$$

is formed by the interference of the input field image, a(x',y') exp[iφ(x',y')], with the synthetic reference wave (SRW), $\bar{\alpha}[\exp(i\theta)-1]g(x', y')$.

The strength of the SRW in Eq. (2) depends on the normalized zero-order $$\bar{\alpha}=|\bar{\alpha}|\exp(i\phi_{\bar{\alpha}})=\int a(x,y)\exp[i\phi(x,y)]dxdy/\int a(x,y)dxdy. \quad (3)$$

while the SRW spatial profile, g(x',y'), arises from the diffraction of the zero-order beam through the PCF aperture $$g(x',y')=\mathfrak{I}^{-1}\{S(f_x,f_y)\mathfrak{I}\{a(x,y)\}\}. \quad (4)$$

For Gaussian illumination with a beam waist, $w_0$, the input amplitude profile is $$a(x,y)=a(r)=\exp[-r^2/w_0^2]. \quad (5)$$

The resulting SRW profile given by $$g(x',y')=g(r')=4\pi^2\int_0^{\Delta f}\int_0^\infty \exp(-r^2/w_0^2)J_0(2\pi f_r r)rJ_0(2\pi f_r r')f_r dr df_r. \quad (6)$$

Adjustment of the PCF size can result in a good match between the bell-shaped SRW spatial profile and the Gaussian illumination. For matched profiles the output intensity becomes $$I(x',y')\approx\exp(-2r^2/w_0^2)|\exp[i\phi(x',y')]+\bar{\alpha}[\exp(i\theta)-1]|^2. \quad (7)$$

Eq. (7) prescribes a method for spatially modulating the output intensity by modulating the input phase to exploit interference effects. Using binary-only phase modulation of the input field and at the spatial filter result in simple "phase-only apertures" that efficiently shape the output by channelling energy from designated dark regions into the desired intensity distributions. However, like their truncating counterparts, these patterns retain characteristic intensity rolloffs from the incident Gaussian illumination.

The ability to produce darkness in the output plane depends on the condition $$\bar{\alpha}[\exp(i\theta)-1]=-1. \quad (8)$$

Under this condition, darkness may be encoded by using zero-phase input and maximum intensity with π-phase input, subject to the Gaussian roll-off as described by Eq. (7). These binary phase inputs result in a real-valued $\bar{\alpha}$, which then requires a PCF that shifts the phase by $\theta=\pi$. To date, most GPC applications have used this π-shift PCF.

Eq. (7) shows that it is possible to eliminate the Gaussian roll-off by producing a reciprocal profile from the interference term:

$$|\exp[i\phi(x',y')]+\bar{\alpha}[\exp(i\theta)-1]|^2 = I_0\exp(2r'^2/w_0^2)A(x',y') \quad (9)$$

where $A(x', y')$ describes the target profile and $I_0$ is the target uniform intensity to be determined based on energy conservation. This approach abandons the use of binary phase inputs and instead requires encoding over a continuous phase range. The effect of this correction on the output process is graphically illustrated in FIG. 3(a). Here, amplitude mismatched points on the input plane produce amplitude-matched outputs after suitable phase encoding where smaller amplitudes are phase-encoded closer to π and larger amplitudes are encoded conversely.

Figure 3:
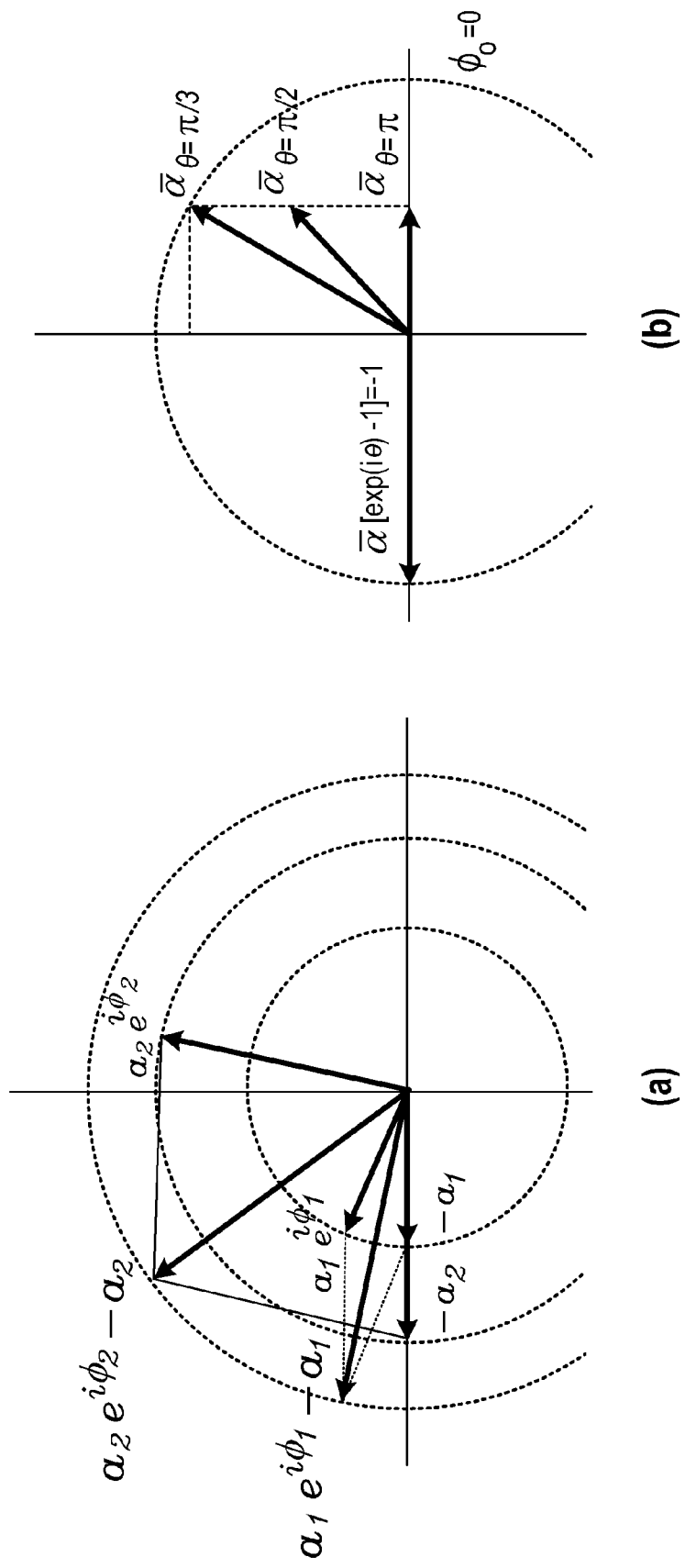
FIG. 3 is a phasor illustration of the design of an embodiment of the present invention.

FIG. 3 (a) shows a phasor illustration of utilization of appropriate phases $\phi_1$ and $\phi_2$ compensating for the amplitude difference between $a_1$ and $a_2$ such that respective superposition with amplitude-mismatched synthetic reference phasors produce matching amplitudes.

FIG. 3 (b) shows phasor examples of the normalized zero-order, $\bar{\alpha}$, matching PCF phase shifts $\theta=\pi/3$, $\pi/2$, and π, respectively. The real part of $\bar{\alpha}=\frac{1}{2}$ is indicated by the vertical dashed line while the maximum value of $\bar{\alpha}=\sqrt{\sqrt{3}/2}$ is indicated by the horizontal dashed line. When $\bar{\alpha}$ and $\theta$ are matched, the darkness condition $\bar{\alpha}[\exp(i\theta)-1]=-1$ is fulfilled.

The "darkness condition" specified by Eq. (8) leads, upon employing trigonometric identities, to the required normalized zero-order $$\bar{\alpha} = \bar{\alpha}_R + i\bar{\alpha}_I = \frac{1}{2} + \frac{i}{2}\cot(\theta/2). \quad (10)$$

This requirement specifies a practical range for $\bar{\alpha}$ as illustrated in the phasor diagram of FIG. 3(b) for the upper semi-circle (the lower semi-circle has a symmetric set of solutions). The dotted lines indicate the requirement set by Eq. (10) that the real part of $\bar{\alpha}$ be ½ and the maximal magnitude of the imaginary part is $\sqrt{3}/2$. Furthermore, Eq. (10) allows us to determine the required phase shift, $\theta$, from the imaginary part of $\bar{\alpha}$:

$$\theta=2\cot^{-1}(2\bar{\alpha}_{imaginary})=2\cot^{-1}[2\int a(x,y)\sin[\phi(x,y)]dxdy/\int a(x,y)dxdy]. \quad (11)$$

Applying Eq. (8) into Eq. (9) leads to the simplified relation $$|\exp[i\phi(x',y')]-1|^2 = I_0\exp(2r'^2/w_0^2)A(x',y'). \quad (12)$$

Applying the trigonometric identity $|\exp(i\phi)-1|^2=2-2\cos(\phi)$ into Eq. (12) yields $$\cos[\phi(r')] = 1 - \frac{I_0}{2}\exp(2r'^2/w_0^2)A(x', y'). \quad (13)$$

Solving this equation yields the correct phase inputs that produce uniform outputs.

Spatially encoding the phase of an incident Gaussian beam can introduce frequency components close to the zero-order beam in the Fourier plane. This can set upper limits on practical PCF sizes to avoid SRW distortions. The Fourier relation between the PCF and output planes means that using a smaller broadens the SRW. Also, the central value of its spatial profile, $g(x',y')$, obtained from Eq. (6), drops to $$g(0,0)=1-\exp(-\gamma^2), \quad (14)$$

where $\gamma=\Delta f_r/(\pi w_0)$ expresses the radius of the PCF in terms of the conjugate Gaussian beam waist parameter in the Fourier plane. In this case, the output in Eq. (7) is revised to $$I(x',y') \approx |\exp(-r'^2/w_0^2)\exp[i\phi(x',y')]+g(x',y')\bar{\alpha}[\exp(i\theta)-1]|^2 \quad (15)$$

to account for the mismatch.

Having mismatched signal and SRW profiles mean that darkness cannot be guaranteed at arbitrarily chosen points. However, beam shaping tasks such as Gaussian-to-circular flattop conversion requires darkness only in certain peripheral regions, which can be achieved with minor losses. For instance, appropriately choosing another negative constant, $-k$, for the right hand side of Eq. (8) can optimize the efficiency. Following similar development that led to Eq. (13) yields $$\cos[\phi(r')] = \frac{1 + k^2[a_0(x', y')]^2 - I_0\exp(2r'^2/w_0^2)A(x', y')}{2ka_0(x', y')}, \quad (16)$$

where $a_0(x',y')=g(x',y')/\exp(-r'^2/w_0^2)$ a measure of how much the SRW is deviates from the Gaussian profile. Eq. (16) reduces to Eq. (13) for the matched case, $k=a_0(x',y')=1$.

For illustration, let us consider the conversion of a Gaussian input beam into a circular flattop having intensity $I_0$ and radius $r_0$. This process is subject to the constraints imposed by energy conservation:

$$2\pi\int_0^\infty \exp(-2r^2/w_0^2)rdr = \frac{\pi w_0^2}{2}\pi r_0^2 I_0. \quad (17)$$

For a circular flattop target intensity, $I(x', y')=I_0\text{circ}(r/r_0)$. Eqs. (7), (13) and (17) are combined to get $$\cos[\phi(r')] = 1 - \frac{w_0^2}{4r_0^2}\exp(2r'^2/w_0^2)\text{circ}(r'/r_0). \quad (18)$$

Solving Eq. (18) for $\phi(r')$ produces the necessary phase input that converts a Gaussian input into a circular flattop. Similarly, Eq. (18) imposes that the range of $r_0$ to be $0.4227w_0 < r_0 < 1.037w_0$ since the right hand side must evaluate to within the range −1 to 1, inclusive. This is the range of $r_0$ where most energy-efficient beam conversion can be achieved.

The $\phi(r')$ obtained from Eq. (18) can then be used in Eq. (11) to find the matching PCF phase shift, $\theta$ $$\theta = 2\cot^{-1}\left(\frac{\frac{4}{w_0^2}\int_0^{r_0}\sin\left\{\cos^{-1}\left[1-\frac{w_0^2}{4r_0^2}\exp(2r'^2/w_0^2)\right]\right\}}{\exp(-r'^2/w_0^2)r'dr'}\right) \quad (19)$$

where the denominator has been evaluated and the circ($r'/r_0$) appears as the upper limit of the integration.

In the next section, the performance of GPC-based conversion of an incident Gaussian illumination beam to arbitrary flattop profiles is illustrated through numerical experiments.

To investigate the expected performance of beam shaping systems based on the principles outlined above, numerical experiments are performed using a Fourier optics-based model of the GPC optical system illustrated in FIG. 1. The results for Gaussian-to-circular flattop beam conversion are illustrated in FIG. 3.

Figure 4:
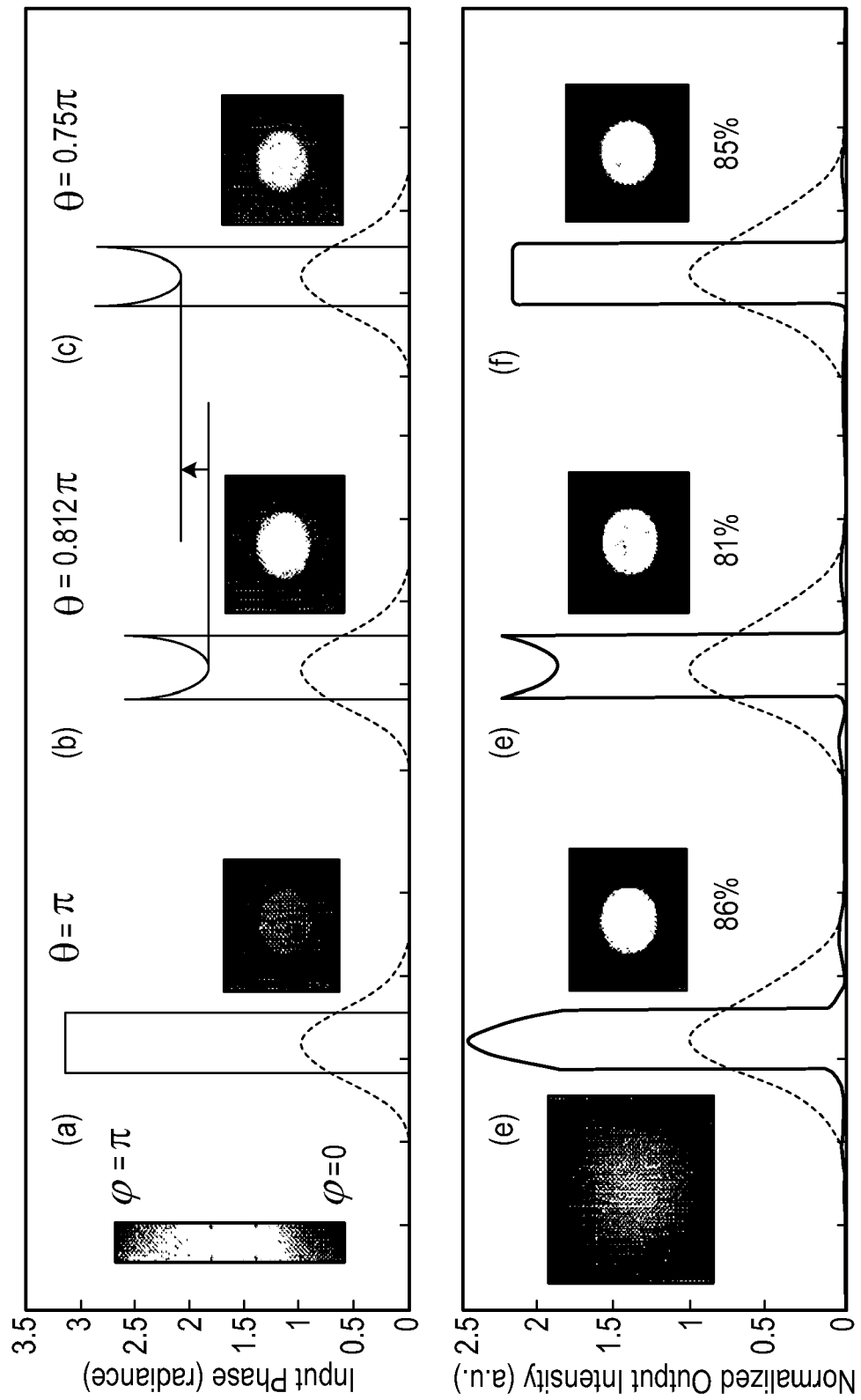
FIG. 4 illustrates schematically the operation of an embodiment of the present invention.

FIG. 4 schematically illustrates operating principles of the invention. FIG. 4 (a)-(c) show the phase shift $\theta$ of the spatial filter at the top. Phase modifications of the phase modifying elements are indicated in grey-scale levels in the square boxes. The grey-levels are indicated by the vertical bar to the left. The linescans indicate the intensity profile along a line traversing a cross-section of the beam of radiation including the centre of the beam. FIG. 4 (d)-(f) show the respective generated output beam intensities in grey-scale levels and linescans. Efficiencies are indicated below each image.

FIGS. 4 (a) and (d) show uncorrected input using 0 and $\pi$ phase only and $\theta=\pi$ with a resulting Gaussian output beam. FIGS. 4 (b) and (e) show corrected input using Eq. (15) with $\theta=0.812\pi$ from Eq. (16) with a resulting overcompensated output beam. FIGS. 4 (c) and (f) show corrected input with compensating phase shift. The input Gaussian beam is shown as inset in (d) and its intensity profile is shown as a dashed line for reference.

In FIGS. 4 (a) and (d), GPC operates as an energy-efficient "phase-only aperture" that redirects light from the surrounding dark region into the central spot with radius 0.45 times the Gaussian beam waist parameter $w_0$. It uses a $\pi$-phase shifting PCF and the binary phase input shown in FIG. 4 (a). The size of the PCF, chosen to optimize the output efficiency, is 1.1 times the conjugate beam waist parameter of the zero-order beam in the Fourier plane. At this PCF size, the SRW profile does not perfectly match the incident Gaussian beam. Consequently, using the phase input determined from Eq. (18) together with the PCF phase prescribed by Eq. (19) produces inhomogeneous output having opposite concavity (see FIGS. 4 (b) and (e)).

The concavity reversal verifies the principles outlined above for correcting the inhomogeneity by adjusting the phase input. Comparison with the uncorrected output shows that the diminished central intensity is accompanied by a corresponding increase in the intensity near the edge. The output may be homogenized by properly controlling the concavity. The flattop profile obtained in FIGS. 4 (c) and (f) indicates that a satisfactory approximation to the phase input prescribed by Eq. (16) can be obtained by simply rescaling and shifting the solution obtained from the matched profile assumption.

Prior to correction, the output profile monotonically rolls off away from the centre, and by as much as 25% at the edge (standard deviation $\sigma=0.182$). The corrected output exhibits a flattop profile with less than 2% roll off that is localized near the edges (standard deviation $\sigma=0.008$). Thus, a uniform output is generated with just a minor efficiency loss.

Figure 5:
FIG. 5 illustrates various beam shapes generated with embodiments of the present invention.

Similar compensation schemes can be used in the energy-efficient conversion of an input Gaussian beam into other flattop profiles as illustrated in FIG. 5.

FIG. 5 shows beam shapes as generated in numerical experiments implementing GPC-based conversion of an input Gaussian beam into various output beams with flattop profiles. The merit figures are indicated below each beam shape: efficiency ($\eta$), maximum fluctuations ($\Delta$), and the intensity standard deviation ($\sigma$); the PCF phase shift ($\theta$) used in the experiment. The scale bar indicates the beam-waist parameter $1/e^2$ width of the Gaussian beam relative to the patterns.

REFERENCES

1. F. M. Dickey and S. C. Holswade, *Laser Beam Shaping: Theory and Techniques* (Marcel Dekker, New York, 2000).
2. F. M. Dickey, S. C. Holswade, & D. L. Shealy, eds., *Laser Beam Shaping Applications* (CRC Press, 2005).
3. M. A. Karim, A. M. Hanafi, F. Hussain, S. Mustafa, Z. Samberid, and N. M. Zain, "Realization of a uniform circular source using a two-dimensional binary filter," Opt. Lett. 10, 470-(1985).
4. S. P. Chang, J. M. Kuo, Y. P. Lee, C. M. Lu, and K. J. Ling, "Transformation of Gaussian to Coherent Uniform Beams by Inverse-Gaussian Transmittive Filters," Appl. Opt. 37, 747-752 (1998).
5. B. R. Frieden, "Lossless conversion of a plane laser wave to a plane wave of uniform irradiance," Appl. Opt. 4, 1400-(1965).
6. P. H. Malyak, "Two-mirror unobscured optical system for reshaping the irradiance distribution of a laser beam," Appl. Opt. 31, 4377-(1992).
7. J. A. Hoffnagle and C. M. Jefferson, "Design and Performance of a Refractive Optical System that Converts a Gaussian to a Flattop Beam," Appl. Opt. 39, 5488-5499 (2000)
8. F. Wippermann, U. D. Zeitner, P. Dannberg, A. Bräuer, and S. Sinzinger, "Beam homogenizers based on chirped microlens arrays," Opt. Express 15, 6218-6231 (2007),
9. C. Y. Han, Y. Ishii, and K. Murata, "Reshaping collimated laser beams with Gaussian profile to uniform profiles," Appl. Opt. 22, 3644-(1983).
10. M. T. Eismann, A. M. Tai, and J. N. Cederquist, "Iterative design of a holographic beamformer," Appl. Opt. 28, 2641-(1989)
11. T. Dresel, M. Beyerlein, and J. Schwider, "Design and fabrication of computer-generated beam-shaping holograms," Appl. Opt. 35, 4615-4621 (1996).
12. J. S. Liu and M. R. Taghizadeh, "Iterative algorithm for the design of diffractive phase elements for laser beam shaping," Opt. Lett. 27, 1463-1465 (2002).
13. J. Glückstad, "Phase contrast image synthesis," Opt. Commun. 130, 225-230 (1996).
14. J. Glückstad and P. C. Mogensen, "Optimal phase contrast in common-path interferometry," Appl. Opt. 40, 268-282 (2001).
15. F. Zernike, "How I discovered phase contrast," Science 121, 345-349 (1955).
16. J. Glückstad, L. Lading, H. Toyoda, and T. Hara, "Lossless light projection," Opt. Lett. 22, 1373-1375 (1997).

17. P. J. Rodrigo, R. L. Eriksen, V. R. Dada, and J. Glückstad, "Interactive light-driven and parallel manipulation of inhomogeneous particles," Opt. Express 10, 1550-1556 (2002), 18. P. J. Rodrigo, V. R. Dada, and J. Glückstad, "Real-time three-dimensional optical micromanipulation of multiple particles and living cells," Opt. Lett. 29 2270-2 (2004).

19. P. J. Rodrigo, V. R. Dada, and J. Glückstad, "Four-dimensional optical manipulation of colloidal particles," Appl. Phys. Lett. 86, 074103 (2005).

20. I. R. Perch-Nielsen, P. J. Rodrigo, C. A. Alonzo, and J. Glückstad, "Autonomous and 3D real-time multi-beam manipulation in a microfluidic environment," Opt. Express 14, 12199-12205 (2006), 21. P. C. Mogensen and J. Glückstad, "Phase-only optical encryption," Opt. Lett. 25, 566-568 (2000).

22. V. R. Dada, P. J. Rodrigo, S. Sinzinger, and J. Glückstad, "Phase-only optical decryption in a planar-integrated micro-optics system," Opt. Eng. 43 2223-7 (2004).

The invention claimed is:

1. An electromagnetic beam converter for conversion of an input beam of electromagnetic radiation a(x,y) into an output beam having a prescribed target intensity profile I(x',y'), the beam converter comprising a generalized phase contrast system with a phase modifying element positioned for illumination by the input beam a(x,y) and for phase modulation of the input electromagnetic beam by phasor values $e^{i\phi(x,y)}$ thereby forming phase modulated radiation a(x,y) $e^{i\phi(x,y)}$, first Fourier or Fresnel optics positioned in the propagation path of the phase modulated radiation for Fourier or Fresnel transforming the phase modulated electromagnetic radiation a(x,y) $e^{i\phi(x,y)}$, a spatial filter for filtering the Fourier or Fresnel transformed electromagnetic field by in a region of spatial frequencies comprising DC in the Fourier or Fresnel plane phase shifting with a predetermined phase shift value θ the modulated electromagnetic field in relation to the remaining part of the electromagnetic field, and multiplying the amplitude of the modulated electromagnetic field with a constant B, and in a region of remaining spatial frequencies in the Fourier or Fresnel plane, multiplying the amplitude of the modulated electromagnetic field with a constant A, and second Fourier or Fresnel optics for forming an output electromagnetic field with the prescribed intensity profile I(x', y') by Fourier or Fresnel transforming the phase shifted Fourier or Fresnel transformed electromagnetic field, wherein the input beam has a Gaussian intensity profile $$a(x,y)=a(r)=\exp[-r^2/w_0^2]$$

wherein $w_0$ is the beam waist, and r is the distance from the centre of the beam, and wherein the phasor values $e^{i\phi(x,y)}$ and the phase shift value θ are calculated in accordance with the equations:

$$\overline{\alpha}[\exp(i\theta) - 1] = -1,$$

$$\theta = 2\cot^{-1}(2\overline{\alpha}_{imaginary})$$

$$= 2\cot^{-1}\left[\frac{2\int a(x, y)\sin[\phi(x, y)]dxdy}{\int a(x, y)dxdy}\right],$$

$$\cos[\phi(r')] = 1 - \frac{I_0}{2}\exp(2r'^2/w_0^2)I(x', y')$$

wherein $I_0$ is the target uniform intensity to be determined based on energy conservation.

2. An electromagnetic beam converter according to claim 1, wherein the target intensity profile I(x',y') is a circular flattop target intensity profile:

$$I(x',y')=I_0 circ(r'/r_0)$$

and the phasor values $e^{i\phi(x,y)}$ and the phase shift value θ are calculated in accordance with the equations:

$$\cos[\phi(r')] = 1 - \frac{w_0^2}{4r_0^2}\exp(2r'^2/w_0^2)circ(r'/r_0),$$

$$\theta = 2\cot^{-1}\left(\frac{4}{w_0^2}\int_0^{r_0}\sin\left\{\cos^{-1}\left[1 - \frac{w_0^2}{4r_0^2}\exp(2r'^2/w_0^2)\right]\right\}\exp(-r^2/w_0^2)r'dr'\right).$$

3. An electromagnetic beam converter according to claim 1, wherein the input beam has an elliptic beam cross-section.

4. An electromagnetic beam converter according to claim 1, wherein the phase modifying element is adjustable.

5. An electromagnetic beam converter according to claim 1, wherein the spatial filter is fixed.

6. An electromagnetic beam converter according to claim 1, wherein the phase modifying element is attached to a light source emitting the input electromagnetic beam.

7. An electromagnetic beam converter according to claim 1, wherein the phase modifying element is fixed.

8. An electromagnetic beam converter according to claim 7, wherein at least one of the phase modifying element and the spatial filter comprises a complex spatial electromagnetic field modulator that is positioned in the path of the input electromagnetic field and comprises modulator resolution elements ($x_m$, $y_m$), each modulator resolution element ($x_m$, $y_m$) modulating the phase and the amplitude of the electromagnetic field incident upon it with a predetermined complex value $a_m(x_m, y_m)e^{i\phi(x_m, y_m)}$.

9. A method for conversion of an input electromagnetic beam having a non-uniform intensity profile a(x, y) into an output beam having a prescribed target intensity profile I(x', y') using a generalized phase contrast system with a phase modifying element for phase modulation of the input electromagnetic beam a(x,y) by phasor values $e^{i\phi(x,y)}$ thereby forming phase modulated field a(x,y) $e^{i\phi(x,y)}$, and a spatial phase filter for phase shifting with a predetermined phase shift value θ, the method comprising the step of calculating the phasor values $e^{i\phi(x,y)}$ and the phase shift value θ in accordance with the equations:

$$I(x',y')=|a(x',y')\exp[i\phi(x',y')]+\overline{\alpha}[\exp(i\theta)-1]g(x',y')|^2,$$

wherein a(x',y') is a non-constant value representing a non-planar input electromagnetic beam with a non-uniform intensity profile, and $$\overline{\alpha} = |\overline{\alpha}| \exp(i\phi_{\overline{\alpha}}) = \int a(x,y) \exp[i\phi(x,y)] dx dy / \cdot a(x,y) dx dy, \quad (5)$$

and $$g(x',y') = \Im^{-1}\{S(f_x, f_y) \Im\{a(x,y)\}\}, \quad (10)$$

wherein g(x',y') is caused by the diffraction of the zero-order beam through the region of the spatial filter.

10. A method according to claim 9, wherein the input beam has a Gaussian intensity profile $$a(x,y) = a(r) = \exp[-r^2/w_0^2]$$

$w_0$ is the beam waist, and r is the distance from the centre of the beam, and wherein the method further comprises the step of calculating the phasor values $e^{i\phi(x,y)}$ and the phase shift value θ in accordance with the equations:

$$g(x',y') = g(r') = 4\pi^2 \int_0^{\Delta f_r} \int_0^\infty \exp(-r^2/w_0^2) J_0(2\pi f_r r) r J_0 (2\pi f_r r') f_r dr df_r,$$

and $$I(x',y') \neq \exp(-2r^2/w_0^2) |\exp[i\phi(x',y')] + \overline{\alpha}[\exp(i\theta)-1]|^2.$$

11. A method according to claim 9, further comprising the step of calculating the phasor values $e^{i\phi(x,y)}$ and the phase shift value θ in accordance with the equations:

$$\overline{\alpha}[\exp(i\theta) - 1] = -1,$$

$$\theta = 2\cot^{-1}(2\overline{\alpha}_{imaginary})$$

$$= 2\cot^{-1}\left[\frac{2\int a(x,y)\sin[\phi(x,y)]dxdy}{\int a(x,y)dxdy}\right],$$

$$\cos[\phi(r')] = 1 - \frac{I_0}{2}\exp(2r'^2/w_0^2) I(x', y')$$

wherein $I_o$ is the target uniform intensity to be determined based on energy conservation.

12. A method according to claim 11, wherein the target intensity profile I(x',y') is a circular flattop target intensity profile:

$$I(x',y') = I_0 \text{circ}(r/r_0)$$

and the method further comprises the step of calculating the phasor values $e^{i\phi(x,y)}$ and the phase shift value θ in accordance with the equations:

$$\cos[\phi(r')] = 1 - \frac{w_0^2}{4r_0^2}\exp(2r'^2/w_0^2) circ(r'/r_0),$$

$$\theta = 2\cot^{-1}\left(\frac{4}{w_0^2}\int_0^{r_0} \sin\left\{\cos^{-1}\left[1 - \frac{w_0^2}{4r_0^2}\exp(2r'^2/w_0^2)\right]\right\}\exp(-r^2/w_0^2)r'dr'\right).$$

* * * * *